United States Patent [19]

Gust

[11] Patent Number: 4,673,359
[45] Date of Patent: Jun. 16, 1987

[54] WATER PUMP FOR MARINE PROPULSION DEVICES

[75] Inventor: Daniel M. Gust, Libertyville, Ill.

[73] Assignee: Outboard Marine Corporation, Waukegan, Ill.

[21] Appl. No.: 793,715

[22] Filed: Oct. 30, 1985

Related U.S. Application Data

[63] Continuation of Ser. No. 604,930, Apr. 27, 1984, abandoned.

[51] Int. Cl.⁴ .............................................. B63H 21/38
[52] U.S. Cl. ..................................... 440/88; 418/154; 440/900
[58] Field of Search ............... 418/152, 154, 155, 156; 403/372, 351, 352, 355, 356, 359, 383, 358, 357; 440/88, 900

[56] References Cited

U.S. PATENT DOCUMENTS

| | | | |
|---|---|---|---|
| 550,019 | 11/1895 | Gray et al. | 403/352 |
| 599,824 | 3/1898 | Barbour | 403/352 |
| 641,106 | 1/1900 | Hawksworth | 403/352 |
| 3,193,312 | 7/1965 | Ehner | 403/357 |
| 3,955,905 | 5/1976 | Frommholz | 403/357 |
| 4,392,779 | 7/1983 | Bloemers | 418/154 |

FOREIGN PATENT DOCUMENTS

| | | | |
|---|---|---|---|
| 22715 | of 1897 | United Kingdom | 403/352 |
| 0641194 | 1/1979 | U.S.S.R. | 403/352 |

Primary Examiner—Joseph F. Peters, Jr.
Assistant Examiner—Edwin L. Swinehart
Attorney, Agent, or Firm—Michael, Best & Friedrich

[57] ABSTRACT

A fluid pump assembly comprising a circular drive shaft including a flat side, and an impeller hub including an inner surface formed in part by a circular bore receiving the drive shaft and by a generally crescent-shaped keyway adjoining the bore and having opposite ends, one of the ends being blunt, and an arcuate surface extending between the ends. The assembly also comprises a retainer key positioned in the keyway and having a flat surface complementary with the flat side of the drive shaft, an arcuate surface complementary with the arcuate surface of the keyway, and a blunt end complementary with the blunt end of the keyway.

20 Claims, 3 Drawing Figures

WATER PUMP FOR MARINE PROPULSION DEVICES

This application is a continuation of Ser. No. 604,930, filed Apr. 27, 1984, now abandoned.

BACKGROUND OF THE INVENTION

This invention relates to water pumps for marine propulsion devices and, more particularly, to the impeller-drive shaft assembly of such a water pump.

Water pumps in marine propulsion devices typically have rubber vaned impellers that are eccentrically located in the pump chamber. Such an impeller in inherently unevenly loaded, and this causes a wearing action between the impeller hub and the drive shaft with each rotation.

Typical means for the driving of the impeller hub by the drive shaft are, for example, bonding, set screws, through bolts, press fits, and interference fit keys. These means often result in corrosion problems and difficulty in installation or removal. Furthermore, with extended operation, the wearing action between these drive mechanisms and the impeller hub can cause damage to either member and can ultimately result in failure of the water pump. This is especially true when the water pump is operated in an abrasive environment.

Attention is directed to the following U.S. patents which disclose pump impeller-shaft assemblies.

| Patentee | Patent No | Issued |
| --- | --- | --- |
| Shortt | 150,261 | April 28, 1874 |
| Gilbert | 368,468 | August 16, 1887 |
| Gray et al. | 550,019 | November 19, 1895 |
| Barbour | 599,824 | March 1, 1898 |
| Davis | 634,660 | October 10, 1899 |
| Hawksworth | 641,106 | January 9, 1900 |
| Boss | 687,393 | November 26, 1901 |
| Veitch, Jr. | 2,883,838 | April 28, 1959 |
| Steiner | 3,438,660 | April 15, 1969 |
| Swiderski et al. | 3,994,608 | November 30, 1976 |
| Schonwald et al. | 4,172,678 | October 30, 1979 |

Attention is also directed to co-pending Bland application Ser. No. 560,593, filed on Dec. 12, 1983, now U.S. Pat. No. 4,592,733 and entitled "Water Pump For Marine Propulsion Devices."

SUMMARY OF THE INVENTION

The invention provides a fluid pump assembly comprising a circular drive shaft including a flat side, an impeller hub including an inner surface formed in part by a circular bore receiving the drive shaft and by a generally crescent-shaped keyway adjoining the bore and having opposite ends, one of the ends being blunt, and an arcuate surface extending between the ends. The assembly also comprises a retainer key positioned in the keyway and having a flat surface complementary with the flat side of the drive shaft, an arcuate surface complementary with the arcuate surface of the keyway, and a blunt end complementary with the blunt end of the keyway.

In one embodiment, the retainer key is made of a deformable plastic.

In one embodiment, the circular bore in the impeller has a radius, and the arcuate surface of the keyway has a constant radius that is greater than the radius of the circular bore.

The invention also provides a fluid pump assembly comprising a circular drive shaft including a flat side, and an impeller hub including a circular bore having a radius and forming a part of an inner surface of the impeller hub, the circular bore receiving the drive shaft, and a generally crescent-shaped keyway adjoining the bore and forming a part of the inner surface of the impeller hub. The keyway has opposite ends, one of the ends being blunt, and an arcuate surface extending between the ends and having a constant radius that is greater than the radius of the circular bore. The assembly also comprises a generally crescent-shaped retainer key positioned in the keyway and having a flat surface complementary with the flat side of the drive shaft, an arcuate surface complementary with the arcuate surface of the keyway, and a blunt end complementary with the blunt end of the keyway.

In one embodiment, the retainer key is made of a deformable plastic.

The invention also provides a fluid pump assembly comprising a circular drive shaft including a flat side, means for rotating said drive shaft, and an impeller hub including a circular bore receiving the drive shaft and forming a part of an inner surface of the impeller hub, and a keyway adjoining the bore and forming a part of the inner surface of the impeller hub. The keyway is generally crescent-shaped and has opposite ends, one of the opposite ends being blunt, and an arcuate surface extending between the ends. The assembly also comprises a generally crescent-shaped retainer key having a flat surface complementary with the flat side of the drive shaft, an arcuate surfce complementary with the arcuate surface of the keyway, a blunt end complementary with the blunt end of the keyway, and a pointed end opposite the blunt end. The retainer key is positioned in the keyway such that, when the drive shaft is rotated in the direction from the blunt end of the keyway toward the opposite end of the keyway, the pointed end of the retainer key is wedged between the drive shaft and the impeller hub to lock the drive shaft and the impeller hub in a single driving relation to each other.

In one embodiment, the retainer key is made of a deformable plastic.

A principal feature of the invention is that while the construction of the fluid pump assembly makes the impeller hub easy to install on and remove from the drive shaft, it also causes the drive shaft and the impeller hub to be maintained in a single driving relation to each other during rotation of the drive shaft.

Another principal feature of the invention is the simple construction of the impeller-drive shaft assembly.

Other features and advantages of the invention will become apparent to those skilled in the art upon review of the following detailed description, drawings, and claims.

Figure 1:
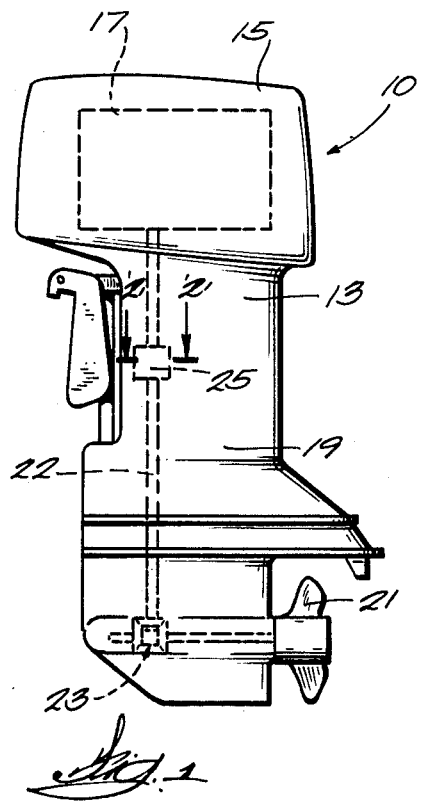
FIG. 1 is a side view of a marine propulsion device including a fluid pump assembly in accordance with the invention.

Before explaining one embodiment of the invention in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Illustrated in FIG. 1 is a marine propulsion device 10 adapted for mounting on the transom of a boat. It is to be understood that while in this embodiment the marine propulsion device 10 is an outboard motor, in alternative embodiments, the marine propulsion device 10 could be of another type, including the inboard/outboard or stern type drive.

In this embodiment, the marine propulsion device 10 includes a generally conventional propulsion unit 13 incorporating a power head 15 with an internal combustion engine 17. The propulsion unit 13 also includes a lower unit 19 incorporating a rotatably mounted propeller 21 drivingly connected to the engine 17 through a drive shaft 22 and a selectively operable reversing transmission 23. The internal combustion engine 17 includes a generally conventional cooling jacket.

A water pump 25 is provided to provide cooling water to the cooling jacket of the engine 17. In this embodiment, the water pump 25 is located in the middle of the drive shaft 22. It should be understood that, in alternative embodiments, the water pump 25 could be located anywhere that driving means can be provided. It should also be remembered that other types of marine propulsion devices might be employed.

The water pump 25 comprises a housing including a pump chamber, a water inlet, and a water outlet. Openings in the side of the propulsion unit 13 form the water intake which is connected by a passage to the water inlet of the pump 25. The water outlet is connected to a passage which carries water to the engine cooling jacket. These features of the water pump assembly are not illustrated in the drawings because they are conventional and do not form a part of the invention.

Figure 2:
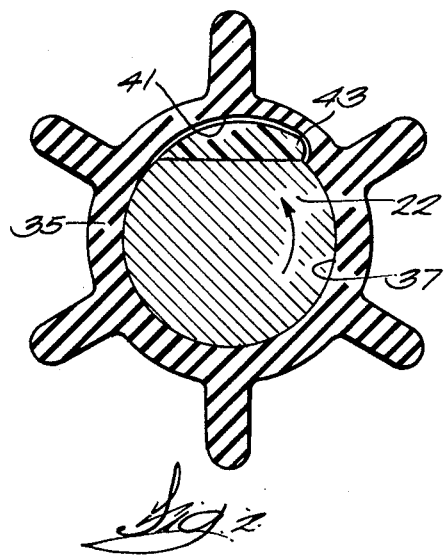
FIG. 2 is a cross-sectional view taken along line 2—2 in FIG. 1 and showing the impeller-drive shaft assembly of the invention.

The water pump 25 further comprises an impeller 35 within the housing. As best shown in FIG. 2, the impeller 35 comprises an impeller hub and a plurality of flexible vanes extending radially outwardly therefrom.

In this embodiment, as shown in FIGS. 1 and 2, the drive shaft 22 extends through the pump chamber, is generally circular, and includes a flat side, as illustrated in FIG. 2.

Figure 3:
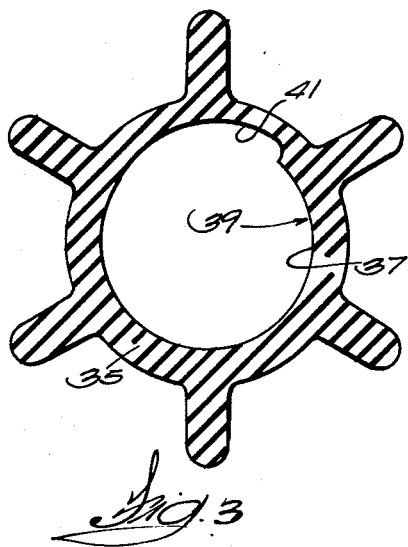
FIG. 3 is a cross-sectional view of the impeller hub of FIG. 2.

The impeller hub includes a circular bore 37 for receiving the drive shaft 22 and forming a part of the inner surface 39 of the impeller hub. The impeller hub also includes a generally crescent-shaped keyway 41 adjoining the bore 37 and forming a part of the inner surface 39 of the impeller hub. As best shown in FIG. 3, the keyway 41 has opposite ends, one of the ends being blunt, and an arcuate surface extending between the ends. In the preferred embodiment, the arcuate surface has a constant radius that is greater than the radius of the circular bore 37, for reasons explained below, although any similar arcuate surface is within the scope of the invention.

The pump 25 also includes a retainer key 43 positioned in the keyway 41, as shown in FIG. 2. The retainer key 43 has a flat surface complementary with the flat side of the drive shaft 22, an arcuate surface complementary with the arcuate surface of the keyway 41, and a blunt end complementary with the blunt end of the keyway 41. In the preferred embodiment, the blunt ends of the keyway 41 and retainer key 43 are circular, as shown in FIGS. 2 and 3, and the length of the flat side of the retainer key 43 is not greater than the length of the flat side of the drive shaft 22.

As shown in FIG. 2, the retainer key 43 is somewhat smaller than the keyway 41 so that the fit between the retainer key 43 and the impeller hub and drive shaft 22 is not snug. This allows easy installation and removal of the impeller 35.

To install the impeller 35 onto the drive shaft 22, the retainer key 43 is slid into the keyway 41, and then the impeller 35 is slid over the drive shaft 22 so that the drive shaft 22 is received in the circular bore 37 in the impeller hub. Because the fit between the retainer key 43 and the impeller hub and drive shaft 22 is not snug, it is very easy to slide the impeller 35 onto the drive shaft 22. The impeller 35 is oriented relative to the drive shaft 22 so that during normal operating rotation of the drive shaft 22, the drive shaft 22 will rotate in the direction from the blunt end of the keyway 41 toward the pointed end of the keyway 41, as shown by the arrow in FIG. 2.

Normal operating rotation (shown by the arrow in FIG. 2) of the drive shaft 22 will cause the pointed end of the retainer key 43 to become wedged or fixed between the drive shaft 22 and the impeller hub at the pointed end of the keyway 41. This wedging action will cause the drive shaft 22 and the impeller hub to be locked in a single driving relation to each other, thus avoiding wearing action between the impeller hub and the drive shaft 22. The preferred shape of the arcuate surfaces of the keyway 41 and retainer key 43, an arc having a constant radius that is greater than the radius of the circular bore 37, improves this wedging action. Furthermore, since the retainer key 43 is preferably made of a deformable plastic, the retainer key 43 will conform to the shape of the inner surface 39 of the impeller hub, thereby essentially eliminating close tolerance and corrosion through electrolysis.

Also, the retainer key 43 will remain wedged between the drive shaft 22 and the impeller hub when rotation of the drive shaft 22 is stopped. Therefore, little or no wearing action will occur during stopping and starting of the pump 25.

To remove the impeller 35, the impeller 35 is rotated relative to the drive shaft 22 in the direction that is the reverse of the direction of normal operating rotation. This reverse rotation of the impeller 35 will unwedge the retainer key 43 from between the drive shaft 22 and the impeller hub and will cause the blunt end of the keyway 41 to engage the blunt end of the retainer key 43. Because of the configuration of these blunt ends, the retainer key 43 cannot become wedged between the drive shaft 22 and the impeller hub when the blunt ends engage due to reverse rotation of the drive shaft 22. Therefore, rotation of the impeller 35 in this reverse direction will release the drive shaft 22, retainer key 43, and impeller hub from their wedged position, leaving the retainer key 43 loosely received in the keyway 41 between the drive shaft 22 and the impeller hub. From this position, it is very easy to remove the impeller 35 and retainer key 43 from the drive shaft 22.

Various of the features of the invention are set forth in the following claims:

I claim:

1. A fluid pump assembly comprising a substantially circular drive shaft including a cross section having an outer periphery comprising a portion of circular shape having opposite ends and a flat portion extending between said ends, an impeller hub including an inner surface formed, in part, by a circular bore receiving said drive shaft and, in part, by a generally crescent-shaped keyway adjoining said bore and including an arcuate surface having a first end extending smoothly from said bore, and a retainer key positioned in said keyway and having an arcuate surface complementary with said arcuate surface of said keyway, a flat surface which has a first end extending from one end of said arcuate surface of said retainer key, which is complementary with said flat portion of said drive shaft, which, at said first end and in cooperation with said arcuate surface of said retainer key, defines a pointed end, and which has a second end, and a blunt end located at said second end.

2. A fluid pump assembly as set forth in claim 1 wherein said retainer key is made of a deformable plastic.

3. A fluid pump assembly as set forth in claim 1 wherein said circular bore in said impeller has a radius, and wherein said arcuate surface of said keyway has a portion with a constant radius that is greater than the radius of said circular bore.

4. A fluid pump assembly as set forth in claim 3 wherein said retainer key is made of a deformable plastic.

5. A fluid pump assembly comprising a substantially circular drive shaft including a flat side with a predetermined length, an impeller hub including a circular bore having a radius and forming a part of an inner surface of said impeller hub, said circular bore receiving said drive shaft, and a generally crescent-shaped keyway adjoining said bore and forming a part of said inner surface of said impeller hub and including an arcuate surface which includes a first end extending smoothly from said bore and which has a constant radius greater than the radius of said circular bore, and a retainer key positioned in said keyway and having an arcuate surface which is complementary with said arcuate surface of said keyway, a flat surface which has a first end extending from one end of said arcuate surface of said retainer key, which has a length substantially equal to said length of said flat side of said drive shaft, which, at said first end and in cooperation with said arcuate surface of said retainer key, defines a pointed end, and which has a second end, and a blunt end located at said second end.

6. A fluid pump assembly as set forth in claim 5 wherein said retainer key is made of a deformable plastic.

7. A fluid pump assembly comprising a substantially circular drive shaft including a cross section having an outer periphery comprising a portion of circular shape having opposite ends and a flat portion extending between said ends and having a length, means for rotating said drive shaft, an impeller hub including a circular bore receiving said drive shaft and forming a part of an inner surface of said impeller hub, and a keyway adjoining said bore and forming a part of said inner surface of said impeller hub, said keyway being generally crescent-shaped and having an arcuate surface including a first end which extends smoothly from said bore, and a second end which extends transversely from said bore, and a retainer key having an arcuate surface which is complementary with said arcuate surface of said keyway and which includes an end, a flat surface which has a first end extending from said end of said arcuate surface of said retainer key, which is complementary with said flat portion of said drive shaft, which, at said first end and in cooperation with said arcuate surface of said retainer key, defines a pointed end, and which has a second end, and a blunt end located at said second end, said retainer key being positioned in said keyway such that, when said drive shaft is rotated in the direction from said blunt portion of said key toward said pointed portion of said key, said pointed portion of said retainer key is wedged between said drive shaft and said impeller hub to lock said drive shaft and said impeller hub in a single driving relation to each other.

8. A fluid pump assembly as set forth in claim 7 wherein said retainer key is made of a deformable plastic.

9. A fluid pump assembly comprising a substantially circular drive shaft including a flat side, an impeller hub including an inner surface formed, in part, by a circular bore receiving said drive shaft and, in part, by a generally crescent-shaped keyway adjoining said bore and defined, in part, by an arcuate surface including a first end which extends smoothly from said bore, and a retainer key positioned in said keyway and having an arcuate surface complementary with said arcuate surface of said keyway and including an end, a flat surface which has a first end extending from said end of said arcuate surface of said retainer key, which is complementary with said flat side of said drive shaft, which, at said first end and in cooperation with said arcuate surface of said retainer key, defines a pointed end, and which has a second end, and a blunt end located at said second end.

10. A fluid pump assembly as set forth in claim 9 wherein said retainer key is made of a deformable plastic.

11. A fluid pump assembly comprising a substantially circular drive shaft including a flat side having a length, an impeller hub including an inner surface formed, in part, by a circular bore receiving said drive shaft and, in part, by a generally crescent-shaped keyway adjoining said bore and defined by an arcuate surface having a first end which extends smoothly from said bore and which, together with said flat side of said drive shaft, defines a pointed end, and a retainer key positioned in said keyway and having an arcuate surface which is complementary with said arcuate surface of said keyway, a flat surface which has a first end extending from one end of said arcuate surface of said retainer key, which has a length substantially equal to said length of said flat side of said drive shaft, which, at said first end of said retainer key, and in cooperation with said arcuate surface of said retainer key, defines a pointed end, and which has a second end, and a blunt end located at said second end.

12. A fluid pump assembly as set forth in claim 11 wherein said retainer key is made of a deformable plastic.

13. A fluid pump assembly comprising an impeller hub including a bore having an inner arcuate surface including a first portion having a constant radius and a second portion which extends smoothly from said first portion and has a radius greater than said constant radius, a substantially circular drive shaft extending into said bore and including a flat side, and a retainer key positioned in said bore and having an arcuate surface which is complementary with said second portion of said inner arcuate surface of said hub, a flat surface which is complementary with said flat side of said drive shaft, which, at one end thereof and in cooperation with arcuate surface of said retainer key, defines a pointed end, and which has a second end, and a blunt end located at said second end.

14. A fluid pump assembly as set forth in claim 13 wherein said retainer key is made of a deformable plastic.

15. A fluid pump assembly comprising an impeller hub including a bore having a inner arcuate surface including a first portion having a constant radius and a second portion which extends smoothly from said first portion and has a radius greater than said constant radius, a substantially circular drive shaft extending into said bore and including a flat side with a predetermined length, and a retainer key positioned in said bore and having an arcuate surface which is complementary with said second portion of said inner arcuate surface of said hub, a flat surface which has a first end extending from one end of said arcuate surface of said retainer key, which has a length substantially equal to said length of said flat side of said drive shaft, which, at said first end and in cooperation with said arcuate surface of said retainer key, defines a pointed end, and which has a second end, and a blunt end located at said second end.

16. A fluid pump assembly as set forth in claim 15 wherein said retainer key is made of a deformable plastic.

17. A fluid pump assembly comprising a substantially circular drive shaft including a flat side having an end, an impeller hub including an inner surface formed, in part, by a circular bore receiving said drive shaft and, in part, by a generally crescent-shaped keyway adjoining said bore and defined, in part, by an arcuate surface extending smoothly from said bore and from immediately adjacent said flat side end, and a retainer key positioned in said keyway and having an arcuate surface complementary with said arcuate surface of said keyway and having an end immediately adjacent said flat side end, a flat surface which has a first end extending from said end of said arcuate surface of said retainer key, which is complementary with said flat side of said drive shaft, which, at said first end and in cooperation with said arcuate surface of said retainer key, defines a pointed end, and which has a second end, and a blunt end located at said second end.

18. A fluid pump assembly comprising a substantially circular drive shaft including a flat side having an end and having a length, an impeller hub including an inner surface formed, in part, by a circular bore receiving said drive shaft and, in part, by a generally crescent-shaped keyway adjoining said bore and including an arcuate surface extending smoothly from said bore and, together with said flat side of said shaft, defining a pointed end located immediately adjacent said flat side end, and a retainer key positioned in said keyway and including a pointed end located immediately adjacent said flat side end of said retainer key and being complementary with said pointed end of said keyway, a blunt end spaced from said pointed end of said retainer key, a flat surface extending from said pointed end of said retainer key to said blunt end and having a length substantially equal to said length of said flat side of said drive shaft, and an arcuate surface extending from said pointed end of said retainer key to said blunt end and being complementary with said arcuate surface of said keyway.

19. A fluid pump assembly comprising an impeller hub including a bore having an inner arcuate surface including a first portion which terminates in an end and which has constant radius and a second portion which extends smoothly from said end of said first portion and has a radius greater than said constant radius, a substantially circular drive shaft extending into said bore and including a flat side having an end located immediately adjacent said end of said first portion of said inner arcuate surface, and a retainer key positioned in said bore and having an arcuate surface complementary with said second portion of said inner arcuate surface of said hub and extending from immediately adjacent said end of said first portion of said inner arcuate surface, a flat surface which has a first end extending from immediately adjacent said end of said flat side of said drive shaft, which is complementary with said flat side of said drive shaft, which, at said first end and in cooperation with said arcuate surface of said retainer key, defines a pointed end, and which has a second end, and a blunt end located at said second end.

20. A fluid pump assembly comprising an impeller hub including a bore having an inner arcuate surface including a first portion which terminates in an end and which has a constant radius and a second portion which extends smoothly from said end of said first portion and has a radius greater than said constant radius, a substantially circular drive shaft extending into said bore and including a flat side having an end located immediately adjacent said end of said first portion of said inner arcuate surface, and a retainer key positioned in said bore and including a pointed end located immediately adjacent to said end of said flat side of said drive shaft and said end of said first portion of said inner arcuate surface and pointing in the direction of intended rotation, a blunt end spaced from said pointed end, a flat surface extending from said pointed end to said blunt end and being complementary with said flat side of said drive shaft, and an arcuate surface extending from said pointed end to said blunt end and being complementary with said second portion of said inner arcuate surface of said hub.

* * * * *